United States Patent
Sugiyama

(10) Patent No.: US 11,063,845 B2
(45) Date of Patent: *Jul. 13, 2021

(54) ACTION RECORDS IN VIRTUAL SPACE

(71) Applicant: International Business Machines Corporation, Armonk, NY (US)

(72) Inventor: Yuji Sugiyama, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/743,105

(22) Filed: Jan. 15, 2020

(65) Prior Publication Data
US 2020/0153713 A1 May 14, 2020

Related U.S. Application Data

(63) Continuation of application No. 16/190,226, filed on Nov. 14, 2018, now Pat. No. 10,581,706, which is a continuation of application No. 14/930,061, filed on Nov. 2, 2015, now Pat. No. 10,181,986.

(51) Int. Cl.
*H04L 12/26* (2006.01)
*G06Q 50/00* (2012.01)

(52) U.S. Cl.
CPC ............ *H04L 43/04* (2013.01); *G06Q 50/00* (2013.01); *G06Q 50/01* (2013.01)

(58) Field of Classification Search
CPC ......... H04L 43/04; G06Q 50/00; G06Q 50/01
USPC ............................................................ 726/9
See application file for complete search history.

(56) References Cited

U.S. PATENT DOCUMENTS

| | | | |
|---|---|---|---|
| 8,881,254 B2 | 11/2014 | Applewhite | |
| 9,188,449 B2 | 11/2015 | Biswal | |
| 9,813,522 B2* | 11/2017 | Van Wie | G06Q 10/10 |
| 10,181,986 B2 | 1/2019 | Sugiyama | |
| 10,332,298 B2* | 6/2019 | Luo | G06F 3/0482 |
| 2007/0075993 A1 | 4/2007 | Nakanishi | |
| 2009/0119764 A1 | 5/2009 | Applewhite | |
| 2011/0087732 A1 | 4/2011 | Lakshmanan | |
| 2013/0172085 A1* | 7/2013 | Harrington | A63F 13/795 463/42 |

(Continued)

FOREIGN PATENT DOCUMENTS

KR  20140121764 A  * 10/2014  ........... G06Q 20/386

OTHER PUBLICATIONS

Scharl et al., "An Ontology-based Architecture for Tracking Information across Interactive Electronic Environments", 39th Hawaii International Conference on System Sciences—2006, IEEE (Year: 2006).*

(Continued)

*Primary Examiner* — Khalil Naghdali
(74) *Attorney, Agent, or Firm* — Alexa L. Ashworth; Brian M. Restauro

(57) ABSTRACT

Embodiments of the present invention provide systems and methods for monitoring action records in virtual space. The systems and methods for monitoring action records in virtual space display recorded activity on an avatar within the virtual space by communicating in a virtual space with a user account. The recorded activity is analyzed and processed in order to compile information on the avatar and display an avatar (which is a reflection of the compiled information).

20 Claims, 5 Drawing Sheets

(56) References Cited

U.S. PATENT DOCUMENTS

| | | |
|---|---|---|
| 2013/0275869 A1 | 10/2013 | Haswell |
| 2013/0342534 A1 | 12/2013 | Walker |
| 2014/0208239 A1 | 7/2014 | Barker |
| 2014/0223573 A1 | 8/2014 | Reedy |
| 2015/0089353 A1 | 3/2015 | Folkening |
| 2019/0081872 A1 | 3/2019 | Sugiyama |

OTHER PUBLICATIONS

Scharl et al., "An Ontology-based Architecture for Tracking Information across Interactive Electronic Environments", Proceedings of the 39th Hawaii International Conference on System Sciences—2006, pp. 1-9 (Year: 2006).*

Appendix P—List of IBM Patents or Patent Applications Treated as Related, Filed herewith, 2 Pages.

Sunagimo, "'Five labs' makes a radar-chart of your personality using Facebook", meeti, Jun. 22, 2014, 4 pages, <http://i.meet-i.com/?p=78672>.

\* cited by examiner

ACTION RECORDS IN VIRTUAL SPACE

BACKGROUND OF THE INVENTION

The present invention relates generally to the field of data monitoring and more specifically to monitoring action records in virtual space.

An avatar is the graphical representation of a user or a user's alter ego or character. Avatars may take either a three-dimensional form (in games or virtual worlds) or a two-dimensional form as an icon in Internet forums and other online communities. The term "avatar" can also refer to the personality connected with the screen name or handle of an Internet user. An avatar is a reflection of configured information of an initial setting.

SUMMARY

According to one embodiment of the present invention, a method for monitoring action records in virtual space is provided with the method comprising the steps of: communicating, by one or more processors, in a virtual space with a user account; analyzing, by one or more processors, activity within the virtual space; recording, by one or more processors, the activity within the virtual space; processing, by one or more processors, a subset of the recorded activity; and displaying, by one or more processors, the recorded activity on an avatar within the virtual space.

Another embodiment of the present invention provides a computer program product for monitoring action records in virtual space, based on the method described above.

Another embodiment of the present invention provides a computer system for monitoring action records in virtual space, based on the method described above.

DETAILED DESCRIPTION

Information pertaining to an avatar in a virtual space is reflected by configuring a set of initial settings. An avatar is the graphical representation of a user or a user's alter ego or character. Embodiments of the present invention monitor the changes associated with the real life events of the user to be reflected in an avatar. The manifestation of these changes are typically not immediately reflected in an avatar. Therefore, the methods of a system (described by the embodiments of the present invention) collect the action records of an avatar user (i.e., action analysis) in order to reflect an avatar in virtual space within real time.

Figure 1:
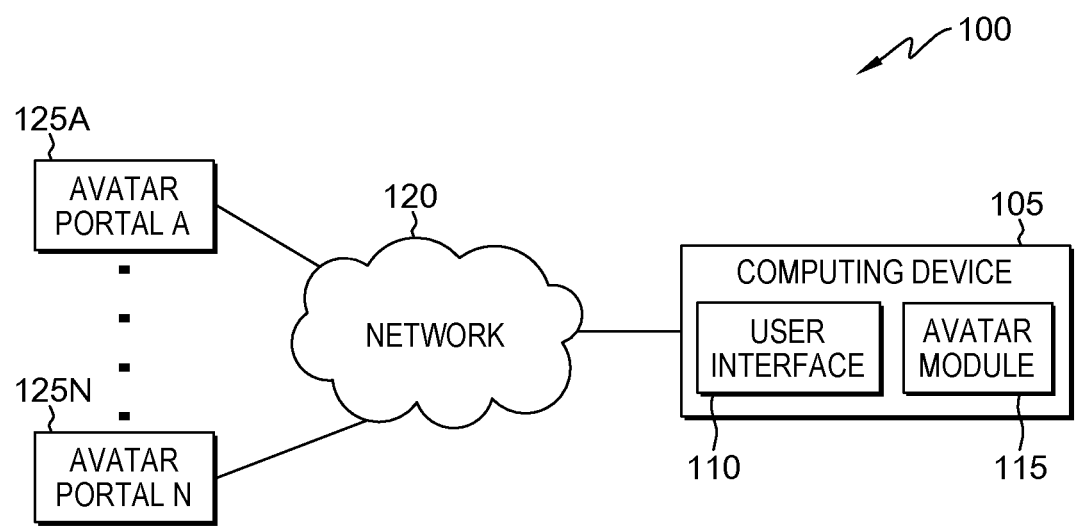
FIG. 1 is a functional block diagram illustrating a data processing environment, in accordance with an embodiment of the present invention.

The present invention will now be described in detail with reference to the Figures. FIG. 1 is a functional block diagram illustrating a data processing environment, generally designated 100, in accordance with one embodiment of the present invention. FIG. 1 provides only an illustration of implementation and does not imply any limitations with regard to the environments in which different embodiments may be implemented. Modifications to data processing environment 100 may be made by those skilled in the art without departing from the scope of the invention as recited by the claims. In this exemplary embodiment, data processing environment 100 includes avatar portals 125A-N and computing device 105 connected by network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communication between computing device 105 and avatar portal 125A-N.

Computing device 105 includes avatar module 115 and user interface 110. Computing device 105 may be a laptop computer, a tablet computer, a netbook computer, a personal computer (PC), a desktop computer, a personal digital assistant (PDA), a smart phone, a thin client, or any programmable electronic device capable of communicating with avatar module 115. Computing device 105 may include internal and external hardware components, as depicted and described in further detail with respect to FIG. 7.

User interface 110 may be for example, a graphical user interface (GUI) or a web user interface (WUI) and can display text, documents, web browser windows, user options, application interfaces, and instructions for operation, and includes the information (such as graphics, text, and sound) a program presents to a user and the control sequences the user employs to control the program. User interface 110 is capable of receiving data, user commands, and data input modifications from a user and is capable of communicating with avatar portal 125A-N and avatar module 115. In some embodiments, user interface 110 may be integrated with avatar module 115.

In this exemplary embodiment, avatar module 115 comprises a virtual space providing system, an analysis system, and an action record system (not depicted in FIG. 1). The configuration of avatar module 115 is described in further detail with respect to FIG. 3. Avatar module 115 performs action analysis. During action analysis, avatar module 115 collects action records. Action records are collected by various record systems within systems such as social network services (SNS) and the driving information from automobiles. An authentication management server unitarily manages access to action record systems which are installed and collect action records from a user. The action records are associated with changes pertaining to the interests of the real life world of the user.

Avatar portals 125A-N are connected to a computing device 105 via network 120. Avatar module 115 accesses data pertaining to avatars on an avatar portal. Avatar portals 125A-N are services to centralize the design, management, digitization, and transportation of avatars. Avatar portals 125A-N are deployed in virtual worlds; online games; social network services; video clips; greeting cards; mobile applications, professional animation projects, and pre-visualization projects. Avatar portals 125A-N enable complex 3D modeling, facilitate user-friendly consumer use, and provide fully interoperable avatars.

Figure 2:
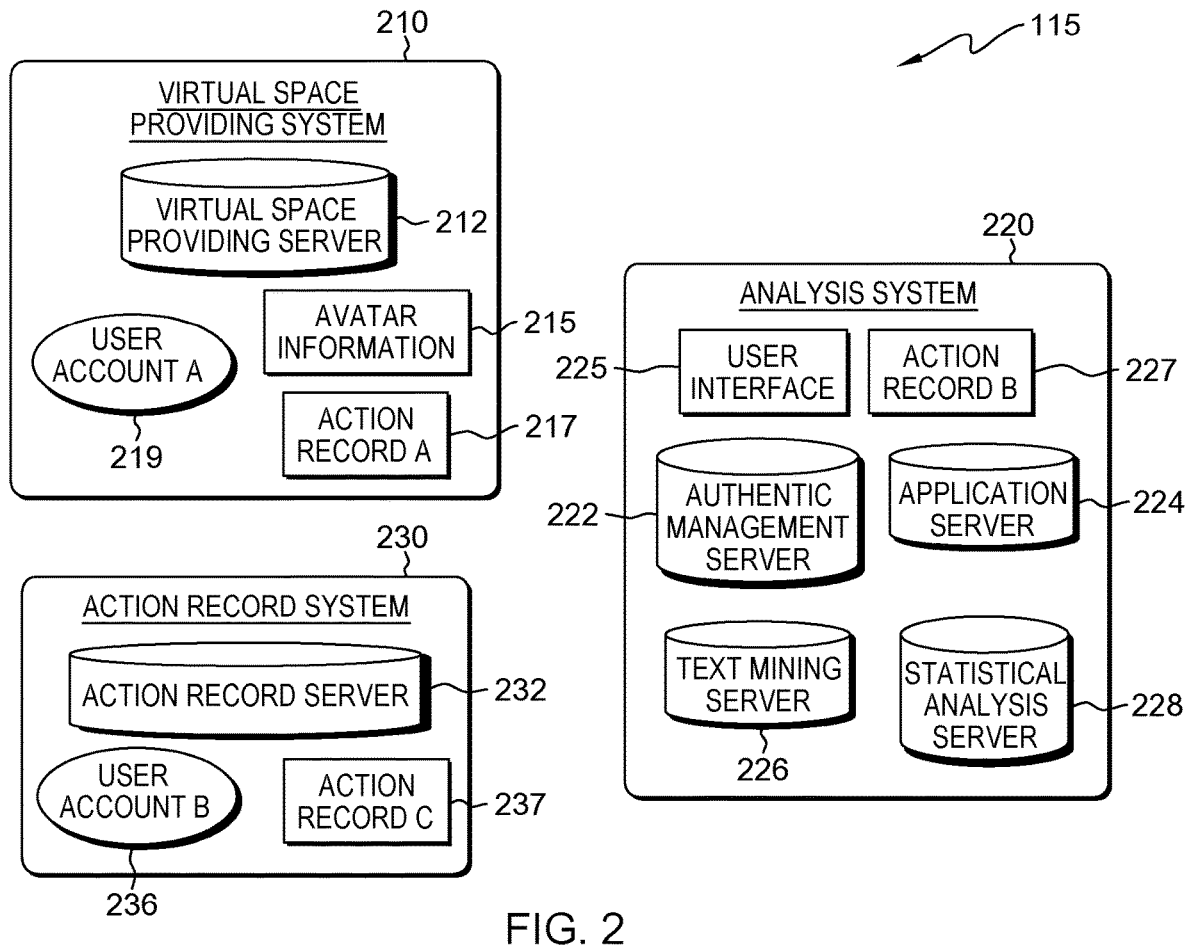
FIG. 2 is a functional block diagram depicting the configuration of avatar module 115, in accordance with an embodiment of the present invention.

FIG. 2 is a functional block diagram depicting the configuration of avatar module 115, in accordance with an embodiment of the present invention.

Avatar module 115 comprises of virtual space providing system 210, analysis system 220, and action record system 230 in order to perform action analysis.

Virtual space providing system 210 includes virtual space providing server 212, avatar information 215, action record A 217, and user account A 219. Avatar module 115 receives instructions from a user to configure virtual space providing server 212 by: starting registration of an account in a virtual space; inquiring about SNS accounts available to facilitate an avatar within virtual space; transmitting account name over a virtual space; and linking user account A 219 within virtual space (e.g., SNS) with the account of an individual action record system. Virtual space providing server 212 operates within a client-server architecture, in which computer programs serve the requests of other programs to provide virtual space to potential users. Virtual space is an emulation of a particular computer system which can be used to enable a function or set of functions. Avatar information 215 is configured by avatar module 115 via a user. Avatar information 215 determines features, actions, and the like of the avatar on the virtual space utilized by a user. User information is transmitted from analysis system 220 and is processed according to: personal information of the user (e.g., age, family structure, academic background, friendship, and the like) and features of the user (e.g., characters and preferences). Action record A 217 is a record of virtual space collected from action record system 230 in view of analysis system 220. Action record A 217 may include riding records of an automobile, purchase records based on a credit card, and other actions which can influence user information reflected in an avatar. User account A 219 is an account of a user within the realm of virtual space.

Analysis system 220 includes user information 225, action record B 227, authentication management server 222, application server 224, text mining server 226, and statistical analysis server 228. Avatar module 115 invokes analysis system 220 in order to: transmit at least one access token (i.e., security credentials for a login session and identifies the user, the user's groups, the user's privileges, and, in some cases, a particular application) of action record system 230 between application server 224 and virtual space providing server 212; prepare user information 225 after performing analytics; transmit user information 225 between application server 224 and virtual space providing server 212; determine and prepare the updates of user information 225 and action record B 227; transmit the updates on user information 225 and action record B 227 between application server 224 and virtual space providing server 212; request and execute analytics on the text and numerical values; transmit results of the analytics performed on the text and numerical values between application server 224 and text mining server 226/statistical analysis server 228; collect data from action record server 232; request user authentication using authentication management server 222; and facilitating logging in by an access token between authentication management server 222 and action record server 232. User information 225 is the initially configured information to be utilized as avatar information by an individual virtual space providing company. Action record B 227 (e.g., the riding records and purchase records mentioned above) is collected from action record system 230 and contains information pertaining to changes within real-life events/interests of the user. Authentication management server 222 operates within a client-server architecture, in which computer programs serve the requests of other programs to manage the authentication required to access action record system 230. Application server 224 operates within a client-server architecture, in which computer programs serve the request of other programs to collect requested action records of accounts utilizing functions which monitor changes in the configuration of user information 225. Application server 224 transmits the monitored changes together with user information 225. Application server 224 comprises of analysis software capable of analyzing images, movies, sounds, etc. Text mining server 226 performs the equivalent of text analytics which is the process of deriving information from text. Text mining typically involves the process of structuring the input text (e.g., parsing, the addition of some derived linguistic features and the removal of others, and subsequent insertion of added derived linguistic features into a database), determining patterns within the structured data, and finally evaluating and interpretation of the output. A combination of techniques of text mining may be utilized. Statistical analysis server 228 performs the equivalent of statistical analytics on numeric values and determines patterns within the numeric values.

In an exemplary embodiment, avatar module 115 invokes analysis system 220 by executing the following steps: determining a user is followed by many people within the SNS owned by the user; determining the user often communicates with many people within the SNS owned by the user; determining the user is sociable; labeling the determination of "sociable" as an attribute; notifying a virtual space providing system of the attribute (which is "sociable" in this embodiment); determining the avatar of the user is talked about by other avatars; and determining the avatar of the user converses with other avatars (especially if it is determined the avatar of the user is friends with another avatar in the same virtual space providing system).

In another embodiment, avatar module 115 invokes analysis system 220 by executing the following steps: utilizing the multiple virtual stages of a virtual space providing system; determining that the user often tweets about, for example, pizza using text mining software; determining that the user likes pizza (based on tweets in this embodiment); labeling the determination of "likes pizza" as an attribute; notifying a virtual space providing system of the attribute (which is "likes pizza" in this embodiment); and facilitating the avatar of the user frequenting an Italian restaurant street stage in the virtual space providing system, which is compatible with the attribute used to notify the virtual space providing system (i.e., "likes pizza" in this embodiment).

In yet another embodiment, avatar module 115 invokes analysis system 220 by executing the following steps: utilizing the multiple virtual stages of a virtual space providing system; determining that the user often tweets about pizza using text mining software; determining that the user likes pizza (based on tweets in this embodiment); labeling the determination of "likes pizza" as an attribute; notifying a virtual space providing system of the attribute (which is "likes pizza" in this embodiment); facilitating a search by the virtual space providing system for other users in the same virtual space for the attribute (which is "likes pizza" in this embodiment); facilitating an investigation for a stage selected by other users compatible with the same attribute (which is "likes pizza" in this embodiment); after concluding the investigation, determining the stage (which is an "Italian restaurant street" in this embodiment); and facilitating the avatar of the user frequenting an Italian restaurant street stage in the virtual space providing system, which is compatible with the attribute used to notify the virtual space providing system (i.e., "likes pizza" in this embodiment).

In another embodiment, avatar module 115 invokes analysis system 220 by executing the following steps: utilizing the multiple virtual stages of a virtual space providing system; determining that the user enjoys outdoor sports using text mining software; utilizing an action log which derives location information/data from a GPS; determining that the user goes to mountains and ocean using statistical analysis software on the action log derived from the GPS utilized by the user; determining the user is an "outdoors type" (based on the findings of the statistical analysis software in this embodiment); labeling the determination of "outdoors type" as an attribute; notifying a virtual space providing system of the attribute (which is "outdoors type" in this embodiment); and facilitating the avatar of the user frequenting a sea stage or mountain stage in the virtual space providing system, which is compatible with the attribute used to notify the virtual space providing system (i.e., "outdoors type" in this embodiment).

In yet another embodiment, avatar module 115 invokes analysis system 220 by executing the following steps: determining the user talks about fashion using text mining software; determining the user often wears a formal suit using image analysis software; determining the user is fashionable and likes formal wear (based on the findings of the text mining software and image analysis software in this embodiment); labeling the determinations of "fashionable" and "likes formal wear" as an attribute; notifying a virtual space providing system of the attributes (which are "fashionable" and "likes formal wear" in this embodiment); and facilitating the avatar of the user wearing a fashionable formal suit and trying on a new suit in virtual space providing system, which is compatible with the attributes used to notify the virtual space providing system (i.e., "fashionable" and "likes formal wear" in this embodiment).

In this exemplary embodiment, avatar module 115 invokes analysis system 220 by executing following steps: determining the user has a friend F, F is the dominant figure in the friendship between the user and F, and F likes Chinese food (based on activities in the SNS of the user); labeling the determinations of "friend F", "F is the dominant figure in the friendship between the user and F", and "F likes Chinese food" as attributes; notifying a virtual space providing system of these attributes (which are "friend F", "F is the dominant figure in the friendship between the user and F", and "F likes Chinese food" in this embodiment); and facilitating the avatar of the user intending to frequent an Italian restaurant in the virtual space providing system and getting influenced by the avatar of F to go to Chinese restaurant, which is compatible with the attributes used to notify the virtual space providing system (i.e., "friend F", "F is the dominant figure in the friendship between the user and F", and "F likes Chinese food" in this embodiment).

Action record system 230 includes action record server 232, user account B 236, and action record C 237. Action record system 230 comprises of at least action logs on a Social Networking Service (SNS) and actions deriving from smart phone, credit cards, automobiles, GPS systems, and other electronic devices. Avatar module 115 receives program instructions in order to: request an access token to a social networking service; and transmit an access token to a virtual space providing company by a social networking service. Action record system 230 includes a social networking service. Action record server 232 operates within a client-server architecture, in which computer programs serve the request of other programs to record actions of a user of a social networking service and/or avatar program. Actions of the user may indicate changes in user information and other information influencing an avatar. User account B 236 is an account of the user with the purpose for recording actions and/or is the login account for a social networking service. Action record C 237 is the data associated with the recorded actions stored by virtual space providing system 210, and analysis system 220, and action record system 230.

Figure 3:
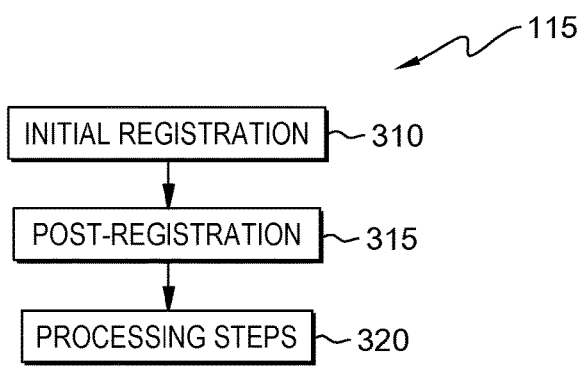
FIG. 3 is a flowchart depicting the operational steps performed by avatar module 115, in accordance with an embodiment of the present invention.

FIG. 3 is a flowchart depicting the operational steps performed by avatar module 115, in accordance with an embodiment of the present invention.

The overall steps performed by avatar module 115 to determine changes in data inputs which influence avatars, record the changes in data inputs which influence avatars as action records, and reflect the changes/action records on the avatar in real-time. The overarching steps carried out by avatar module 115 are: the steps involved in the initial registration in step 310; the steps involved in the post-registration in step 315; and the steps involving in the processing in step 320. Step 310 is described in further detail with respect to FIG. 4. Step 315 is described in further detail with respect to FIG. 5. Step 320 is described in further detail with respect to FIG. 6.

Figure 4:
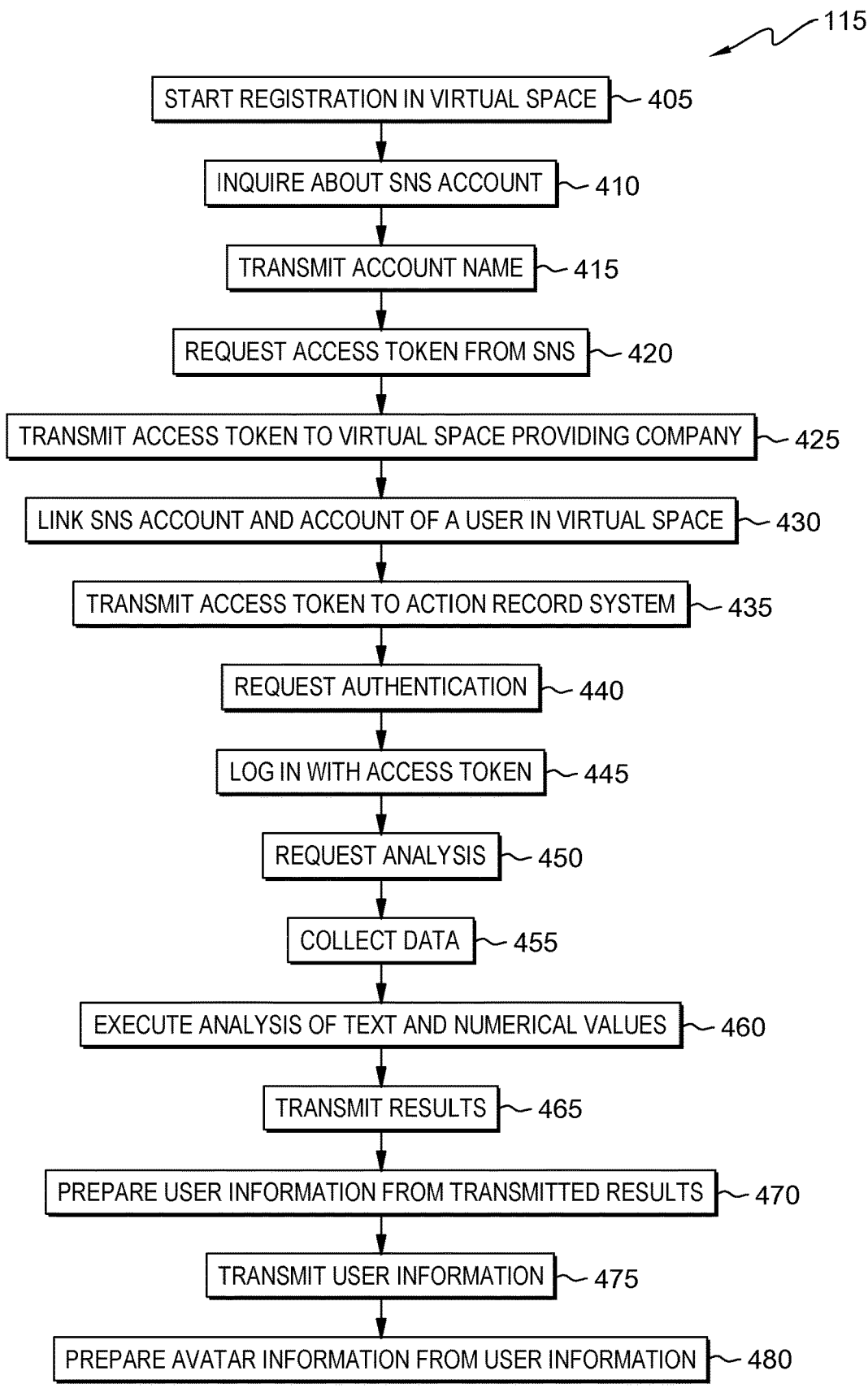
FIG. 4 is a flowchart detailing the operational steps of the initial registration carried out by avatar module 115, in accordance with an embodiment of the present invention.

FIG. 4 is a flowchart detailing the operational steps of the initial registration carried out by avatar module 115, in accordance with an embodiment of the present invention.

The steps carried out by avatar module 115 during the initial registration of user accounts includes: starting registration in virtual space (by setting up a user account in virtual space) in step 405; inquiring about a SNS (social networking service) account (where the SNS account is to be used as a login account for recording actions) in step 410; transmitting account names (of the user account in virtual space and the SNS account) in step 415; requesting an access token from a SNS in step 420; transmitting an access token to a virtual space providing company in step 425; linking the SNS account and the account of a user in virtual space in step 430; transmitting the access token to action record system (between application server 224 in analysis system 220 and virtual space providing server 212 in action record system 230) in step 435; requesting an authentication (in order to access action record system 230 which will record changes in data which influence avatars) in step 440; logging in with an access token (in order to access action record server 232) in step 445; requesting analysis (of text and numerical values residing in text mining server 226 and statistical analysis server 228, respectively) in step 450; collecting data (pertaining to the action records of the user and the action records of friends associated with the user) in step 455; executing analysis of text and numerical values (in order to configure user information by analysis executed on the text and numerical values residing in text mining server 226 and statistical analysis server 228, respectively) in step 460; transmitting results (from the analysis executed on the text and numerical values residing in text mining server 226 and statistical analysis server 228, respectively, to the user information) in step 465; preparing the user information from the transmitted results (which are used as inputs to configure the user information) in step 470; transmit user information (to the avatar information) in step 475; and preparing the avatar information from the user information in step 480.

Figure 5:
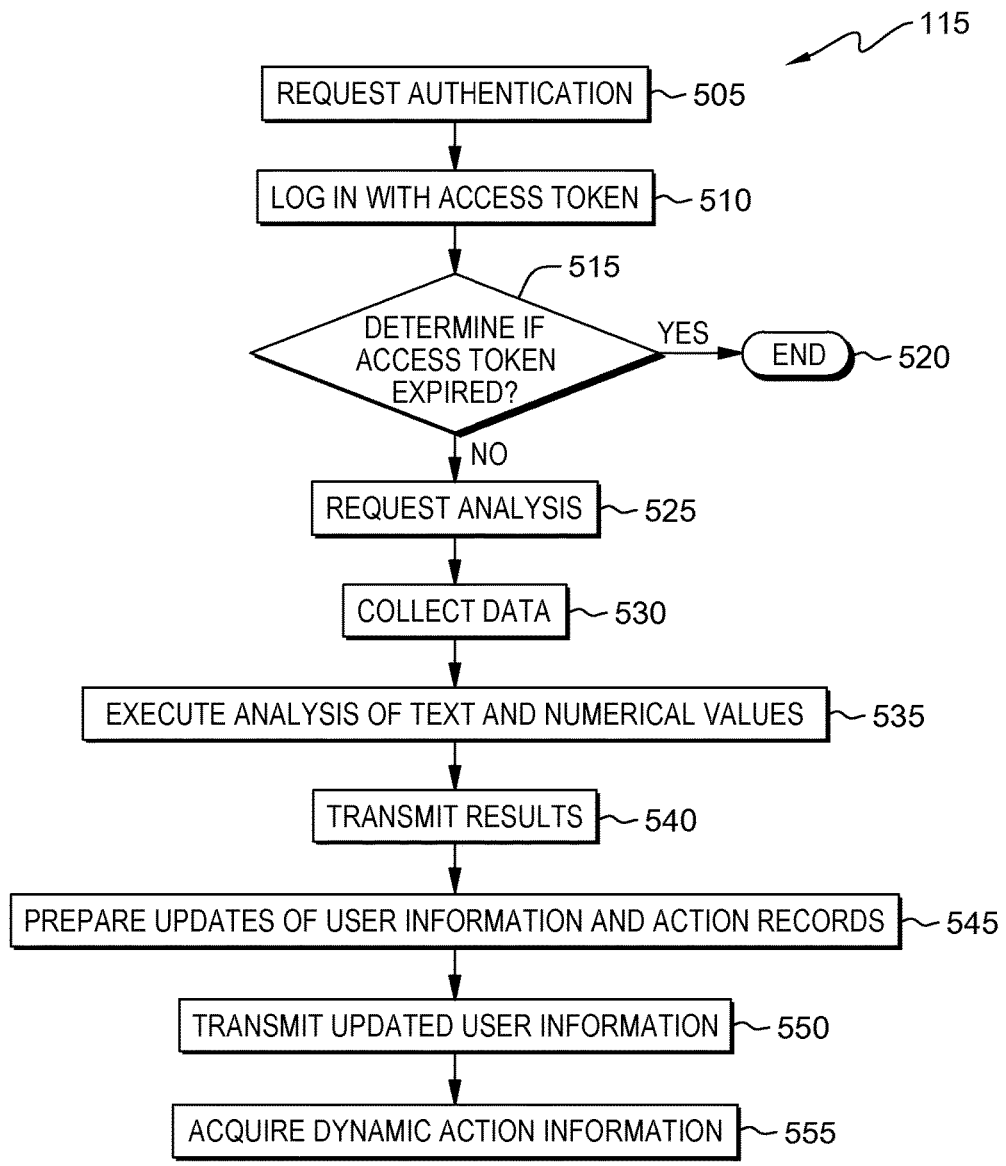
FIG. 5 is a flowchart detailing the operational steps of the post-registration carried out by avatar module 115, in accordance with an embodiment of the present invention.

FIG. 5 is a flowchart detailing the operational steps of the post-registration carried out by avatar module 115, in accordance with an embodiment of the present invention.

The steps carried out by avatar module 115 during the post-registration of user accounts include: requesting an authentication (in order to access action record system 230 which will record changes in data which influence avatars) in step 505; logging in with an access token (in order to access action record server 232) in step 510; determining if the access token expired (to access action record server 232) in step 515; responsive to determining the access token has expired, ending (by ceasing further processing of access tokens) in step 520; responsive to determining the access token has not expired, requesting analysis (of text and numerical values residing in text mining server 226 and statistical analysis server 228, respectively) in step 525; collecting data (pertaining to the action records of the user and the action records of friends associated with the user) in step 530; executing analysis of text and numerical values (in order to configure user information) in step 535; transmitting results (from the analysis executed on the text and numerical values residing in text mining server 226 and statistical analysis server 228, respectively, to the user information) in step 540; preparing updates of user information and actions records (which may indicate changes in user information or other information influencing an avatar) in step 545; transmitting the updated user information (which includes an action record potentially indicative of changes in the initially configured user information or other information influencing an avatar) in step 550; and acquiring dynamic action information (in a continuous manner from linked user accounts and synchronizing the newly acquired dynamic action information with virtual space together with the updated user information from step 550) in step 555.

Figure 6:
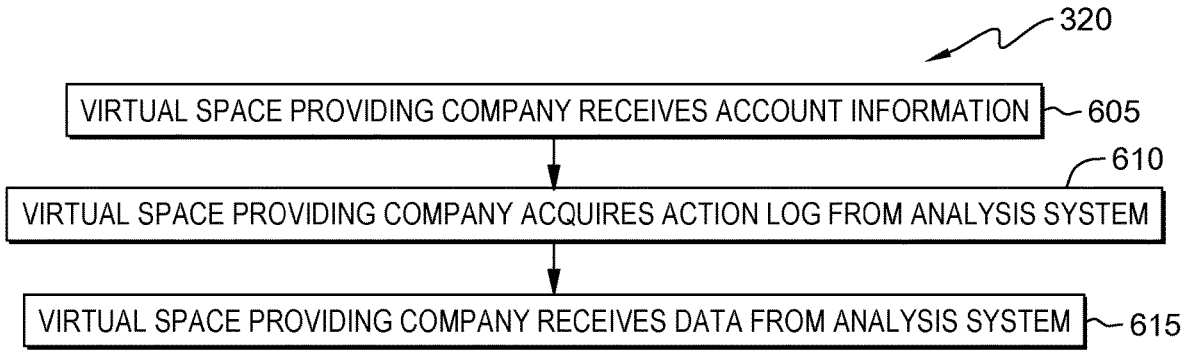
FIG. 6 is a flowchart detailing the operational steps of the processing facilitated by avatar module 115, in accordance with an embodiment of the present invention.

FIG. 6 is a flowchart detailing the operational steps of the processing 320 by a virtual space providing company, in accordance with an embodiment of the present invention.

Avatar module 115 registers user accounts as described with respect to FIGS. 2, 3, 4, and 5. A virtual space providing company processes the user information derived from avatar module 115.

In step 605, a virtual space providing company receives account information. Avatar module 115 obtains user registration information allowing the virtual space providing company to create a user account (i.e., user account A 219). The user account links the action record system account (i.e., user account B 236) and a virtual space providing company account (i.e., user account A 219). In instances when the action record system is a social networking service, an access token of the SNS is acquired by and provided to the virtual space providing company.

In step 610, a virtual space providing company requests acquires of an action log from analysis system 220. The action log may be in the form of a SNS action record (postscript 1), data deriving from outside physical sources (postscript 2), text data (postscript 3), and/or numerical values (postscript 4). In instances where the action log contains text data, text mining software text-mines the information. In instances where the action log contains numerical values, statistical analysis software statistically analyzes the information.

In step 615, a virtual space providing company receives data from analysis system 220. The data which is received from analysis system 220 derives from the action log data in step 610. The virtual space providing company reflects an avatar within virtual space, based the acquired action log data.

In one embodiment, the user account of a virtual space providing company is linked with a user account of an action record system. In instances where the action record system is the SNS action record, a mechanism of a single sign-in provided by the SNS is utilized. The access token authenticated by the user is delivered to the virtual space providing company to access the action record of the SNS instead of the user. The user starts registration of an account within virtual space. The virtual space providing company provides and inquires about the user of an account of the SNS to avatar module 115. Avatar module 115 receives the user request for an access token from the SNS. The SNS returns the access token to the user where the user transmits his or her account and access token to the virtual space providing company. A virtual space operating company accesses the SNS with the access token and links both accounts in a substitutive manner. The access token is not needed in cases that the user discloses information. However, unauthorized access is possible. Instead of utilizing the access token, a mechanism of opening an account for data acquisition is also possible.

In one embodiment, an action log is acquired in instances where the action record system is a SNS action record. The text mining software accesses the SNS by a credential and reads a profile of friends (with SNS accounts) to a user. At this initial point in time, the user information includes the relationships of other people with SNS accounts to the user. The user information is updated and is confirmed periodically at later points in time. The analysis server converts the data obtained via text mining software to user information form. The analysis server transmits the data in user information form to the virtual space providing company. In one exemplary embodiment, the text mining software reads tweets. Based on tweets, the character, preferences, and actions of the person are analyzed by the text mining software. In another exemplary embodiment, text mining software reads tweets, a location as indicated by GPS, and an attached image in a tweet. In other embodiments, comments in restaurant information site (e.g., Tablelog), shopping information on websites or net auctions, and the status of game characters can be also acquired by the similar technology to the text mining software. Information on friends can be also acquired.

In another embodiment, an action log is acquired in instances where the action record derives from outside physical sources. The outside physical sources may be smartphones, automobiles, credit cards, action records from entertainment facilities such as Disneyland. These outside physical sources provide location information to be incorporated within the action log. The method of acquiring information in postscript 3 is similar to the method of acquiring information in postscript 2. The access token or an equivalent access proxy method by a third party (by setting up an account for access separately or the like) needs to be provided from the action record system 230. Smartphone information that is generally utilized derives from GPS data. The GPS data confirms location information to be incorporated within the action log. In another embodiment, information of a system that confirms a location of a person such as Docotch (e.g., a smartwatch with GPS, a monitor, a buzzer, or the like) may be incorporated within the action log. Location information to be incorporated within the action log from automobiles includes position information, riding time, visited location, or the like. In other embodiments, recommendation information of a neighborhood displayed by a car navigation system or the like provides location information. From credit cards, rechargeable prepaid IC cards, a member's card, riding records of trains, shopping information from vending machines, or the like can be obtained to provide location information to be incorporated within the action log.

In yet another embodiment, an output is collected by the action record system after the text mining software analyzes the action logs. The data to be reflected in an avatar in a virtual section (attribute information) include: the characteristics of the user (e.g., intensity of feelings); the preferences of the user (e.g., likes/dislikes of food or the like, categories of interests, specialties, etc.); action patterns (e.g., areas of activities, activities of interests, and situations requiring the utilization of transportation facilities); speech and behavior patterns (e.g., breadth of vocabulary and breadth of knowledge); and the relationships to the user (e.g., family structures, follow-up relations, and academic backgrounds). The examples of attributes applied to the avatars and the implication of the attribute applied to the avatars may include: an outgoing personality who enjoys outdoor implies an individual is the outdoors type sport; a less outgoing personality who enjoys indoor activities, spends time in a library, and enjoy games implies an individual is the indoors type; an individual who often analyzes food implies the individual is a foodie; an individual who often communicates with friends and is followed by many people implies the individual is sociable; and an individual who keenly follows a specific category implies the individual is interested in the category. Additional details pertaining to attributes are described with respect to FIG. 2.

Figure 7:
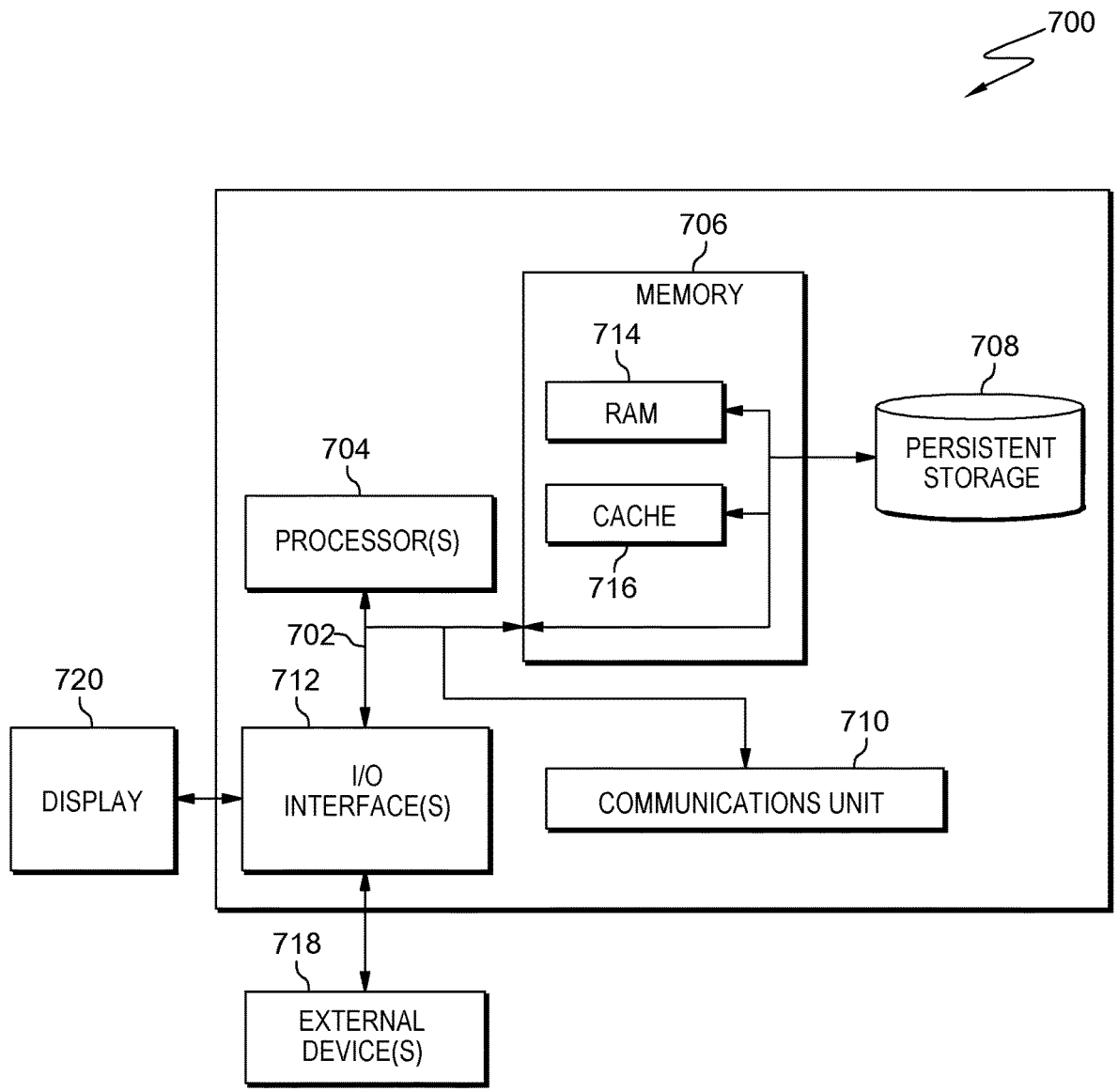
FIG. 7 depicts a block diagram of internal and external components of a computing device, in accordance with an embodiment of the present invention.

FIG. 7 depicts a block diagram of components of a computing device, generally designated 700, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Program instructions and data used to practice embodiments of the present invention may be stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to computing device 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    constructing a plurality of action logs comprising a plurality of postscripts, wherein the plurality of postscripts includes a first postscript that derives from a second postscript, a third postscript, and a fourth postscript;
    identifying attributes from at least one of the first postscript, the second postscript, the third postscript, and the fourth postscript of the plurality of postscripts;
    generating an avatar within a virtual space based on the identified attributes and the plurality of avatar information, in real-time; and
    transmitting an access token from the virtual space to the plurality of action logs through the first postscript, wherein the virtual space contains a plurality of avatar information.

2. The computer-implemented method of claim 1, further comprising:
    analyzing activity that derives from the plurality of action records within the virtual space, wherein the plurality of action records comprise the plurality of postscripts; and
    recording the analyzed activity within the virtual space.

3. The computer-implemented method of claim 1, further comprising:
    communicating in a virtual space with a user account, wherein communicating in the virtual space with the user account, comprises:
        registering the user account within the virtual space,
        requesting the access token from a social networking service (SNS) of the first postscript, which is transmitted to the virtual space, and
        linking a SNS account and the user account within the virtual space.

4. The computer-implemented method of claim 2, wherein analyzing the activity that derives from the plurality of action records within the virtual space, comprises:
- utilizing text mining on text data contained within the third postscript of the plurality of postscripts;
- utilizing statistical analysis on numerical data contained within the fourth postscript of the plurality of postscripts;
- finding images, patterns in user activity, and location information in the identified attributes; and
- preparing avatar information deriving from the text mining, the statistical analysis, the images, the patterns in user activity, and the location information.

5. The computer-implemented method of claim 2, wherein recording the analyzed activity within the virtual space suitable, comprises:
- obtaining updates of the plurality of action logs of the user account in the virtual space in real-time, wherein the plurality of action logs record changes in activity associated with the user account; and
- updating avatar information from the updates of the plurality of action logs of the user account in the virtual space in real-time.

6. The computer-implemented method of claim 5, wherein updating the avatar information from the updates of the plurality of action logs of the user account in the virtual space in real-time, comprises:
- compiling prepared avatar information from data initially processed from user information;
- identifying updated user information based on the plurality of action logs, wherein the plurality of action logs record changes in activity of a user; and
- compiling updated avatar information based on the plurality of action logs.

7. The computer-implemented method of claim 1, wherein generating the avatar within the virtual space in real-time, comprises:
- acquiring dynamic action information associated with the user account;
- updating the plurality of action logs with the dynamic action information associated with the user account; and
outputting the avatar in real-time based on the plurality of action logs with the dynamic action information associated with the user account.

8. A computer program product comprising:
a computer readable storage medium and program instructions stored on the computer readable storage medium, the program instructions comprising:
- program instructions to construct a plurality of action logs comprising a plurality of postscripts, wherein the plurality of postscripts includes a first postscript that derives from a second postscript, a third postscript, and a fourth postscript;
- program instructions to identify attributes from at least one of the first postscript, the second postscript, the third postscript, and the fourth postscript of the plurality of postscripts;
- program instructions to generate an avatar within a virtual space based on the identified attributes and the plurality of avatar information, in real-time; and
- program instructions to transmit an access token from the virtual space to the plurality of action logs through the first postscript, wherein the virtual space contains a plurality of avatar information.

9. The computer program product of claim 8, wherein the program instructions stored on the computer readable storage media further comprise:
- program instructions to analyze activity that derives from the plurality of action records within the virtual space, wherein the plurality of action records comprise the plurality of postscripts; and
- program instructions to record the analyzed activity within the virtual space.

10. The computer program product of claim 8, wherein the program instructions stored on the computer readable storage media further comprise:
- program instructions to communicate in a virtual space with a user account, wherein the program instructions to communicate in the virtual space with the user account, comprise:
  - program instructions to register the user account within the virtual space,
  - program instructions to request the access token from a social networking service (SNS) of the first postscript, which is transmitted to the virtual space, and
  - program instructions to link a SNS account and the user account within the virtual space.

11. The computer program product of claim 9, wherein the program instructions to analyze the activity that derives from the plurality of action records within the virtual space, comprise:
- program instructions to utilize text mining on text data contained within the third postscript of the plurality of postscripts;
- program instructions to utilize statistical analysis on numerical data contained within the fourth postscript of the plurality of postscripts;
- program instructions to find images, patterns in user activity, and location information in the identified attributes; and
- program instructions to prepare avatar information deriving from the text mining, the statistical analysis, the images, the patterns in user activity, and the location information.

12. The computer program product of claim 9, wherein the program instructions to record the analyzed activity within the virtual space suitable, comprise:
- program instructions to obtain updates of the plurality of action logs of the user account in the virtual space in real-time, wherein the plurality of action logs record changes in activity associated with the user account; and
- program instructions to update avatar information from the updates of the plurality of action logs of the user account in the virtual space in real-time.

13. The computer program product of claim 12, wherein the program instructions to update the avatar information from the updates of the plurality of action logs of the user account in the virtual space in real-time, comprise:
- program instructions to compile prepared avatar information from data initially processed from user information;
- program instructions to identify updated user information based on the plurality of action logs, wherein the plurality of action logs record changes in activity of a user; and
- program instructions to compile updated avatar information based on the plurality of action logs.

14. The computer program product of claim 8, wherein the program instructions to generating the avatar within the virtual space in real-time, comprises:

program instructions to acquire dynamic action information associated with the user account;
program instructions to update the plurality of action logs with the dynamic action information associated with the user account; and
program instructions to output the avatar in real-time based on the plurality of action logs with the dynamic action information associated with the user account.

15. A computer system comprising:
one or more computer processors;
one or more computer readable storage media; and
program instructions stored on the one or more computer readable storage media for execution by at least one of the one or more processors, the program instructions comprising:
   program instructions to construct a plurality of action logs comprising a plurality of postscripts, wherein the plurality of postscripts includes a first postscript that derives from a second postscript, a third postscript, and a fourth postscript;
   program instructions to identify attributes from at least one of the first postscript, the second postscript, the third postscript, and the fourth postscript of the plurality of postscripts;
   program instructions to generate an avatar within a virtual space based on the identified attributes and the plurality of avatar information, in real-time; and
   program instructions to transmit an access token from the virtual space to the plurality of action logs through the first postscript, wherein the virtual space contains a plurality of avatar information.

16. The computer system of claim 15, wherein the program instructions stored on the computer readable storage media further comprise:
   program instructions to analyze activity that derives from the plurality of action records within the virtual space, wherein the plurality of action records comprise the plurality of postscripts; and
   program instructions to record the analyzed activity within the virtual space.

17. The computer system of claim 15, wherein the program instructions stored on the computer readable storage media further comprise:
   program instructions to communicate in a virtual space with a user account, wherein the program instructions to communicate in the virtual space with the user account, comprise:
      program instructions to register the user account within the virtual space,
      program instructions to request the access token from a social networking service (SNS) of the first postscript, which is transmitted to the virtual space, and
      program instructions to link a SNS account and the user account within the virtual space.

18. The computer system of claim 16, wherein the program instructions to analyze the activity that derives from the plurality of action records within the virtual space, comprise:
   program instructions to utilize text mining on text data contained within the third postscript of the plurality of postscripts;
   program instructions to utilize statistical analysis on numerical data contained within the fourth postscript of the plurality of postscripts;
   program instructions to find images, patterns in user activity, and location information in the identified attributes; and
   program instructions to prepare avatar information deriving from the text mining, the statistical analysis, the images, the patterns in user activity, and the location information.

19. The computer system of claim 18, wherein the program instructions to record the analyzed activity within the virtual space suitable, comprise:
   program instructions to obtain updates of the plurality of action logs of the user account in the virtual space in real-time, wherein the plurality of action logs record changes in activity associated with the user account; and
   program instructions to update avatar information from the updates of the plurality of action logs of the user account in the virtual space in real-time.

20. The computer system of claim 19, wherein the program instructions to update the avatar information from the updates of the plurality of action logs of the user account in the virtual space in real-time, comprise:
   program instructions to compile prepared avatar information from data initially processed from user information;
   program instructions to identify updated user information based on the plurality of action logs, wherein the plurality of action logs record changes in activity of a user; and
   program instructions to compile updated avatar information based on the plurality of action logs.

* * * * *